(12) United States Patent
Duan

(10) Patent No.: US 12,265,098 B2
(45) Date of Patent: Apr. 1, 2025

(54) SENSOR DATA PROCESSING METHOD, ELECTRONIC DEVICE, AND READABLE STORAGE MEDIUM

(71) Applicant: Honor Device Co., Ltd., Shenzhen (CN)

(72) Inventor: Yangsen Duan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/040,690

(22) PCT Filed: Aug. 29, 2022

(86) PCT No.: PCT/CN2022/115425
§ 371 (c)(1),
(2) Date: Feb. 6, 2023

(87) PCT Pub. No.: WO2023/071489
PCT Pub. Date: May 4, 2023

(65) Prior Publication Data
US 2024/0264197 A1   Aug. 8, 2024

(30) Foreign Application Priority Data
Nov. 1, 2021   (CN) .......................... 202111284471.6

(51) Int. Cl.
*G01P 15/16* (2013.01)
(52) U.S. Cl.
CPC .................................. *G01P 15/16* (2013.01)

(58) Field of Classification Search
None
See application file for complete search history.

(56) References Cited

U.S. PATENT DOCUMENTS

| | | | |
|---|---|---|---|
| 8,589,720 B2 | 11/2013 | Garudadri et al. | |
| 11,403,030 B2 | 8/2022 | Ware et al. | |
| 11,543,248 B2 | 1/2023 | Rosingana et al. | |
| 2010/0083028 A1 | 4/2010 | Oh et al. | |
| 2015/0123827 A1 | 5/2015 | Claus et al. | |

(Continued)

FOREIGN PATENT DOCUMENTS

| | | |
|---|---|---|
| CN | 102007741 A | 4/2011 |
| CN | 106525107 A | 3/2017 |

(Continued)

OTHER PUBLICATIONS

Li et al., "Research on Energy-saving Routing Algorithm ISC-ODR for 3D Wireless Sensor Networks", Computer Science, vol. 41 No. 7, Jul. 2014, 4 pages.

*Primary Examiner* — Jas A Sanghera
(74) *Attorney, Agent, or Firm* — Slater Matsil, LLP

(57) ABSTRACT

This application discloses a sensor data processing method, an electronic device, and a readable storage medium, and relates to the field of data processing technologies. The method includes: obtaining a group of raw sensor data, where the raw sensor data is sensor data output, based on an actual output data rate ODR, by a sensor; and obtaining a group of target sensor data through calculation based on the group of raw sensor data, a target ODR, and the actual ODR. The target sensor data is estimated sensor data output, based on the target ODR, by the sensor, and there is no ODR error.

20 Claims, 10 Drawing Sheets

(56) References Cited

U.S. PATENT DOCUMENTS

| | | | | |
|---|---|---|---|---|
| 2017/0153121 A1* | 6/2017 | Hsu | ............... | G01C 22/006 |
| 2018/0266847 A1* | 9/2018 | Trythall | ............... | G06F 3/012 |
| 2020/0205724 A1* | 7/2020 | Lee | ............... | A61B 5/024 |
| 2020/0240819 A1 | 7/2020 | Milota et al. | | |

FOREIGN PATENT DOCUMENTS

| | | |
|---|---|---|
| CN | 106681670 A | 5/2017 |
| CN | 107153454 A | 9/2017 |
| CN | 109313918 A | 2/2019 |
| CN | 111754954 A | 10/2020 |
| CN | 112394821 A | 2/2021 |
| CN | 114185512 A | 3/2022 |
| WO | 9717809 A1 | 5/1997 |
| WO | 2016057289 A1 | 4/2016 |

\* cited by examiner

SENSOR DATA PROCESSING METHOD, ELECTRONIC DEVICE, AND READABLE STORAGE MEDIUM

CROSS-REFERENCE TO RELATED APPLICATIONS

This application is a national stage of International Application No. PCT/CN2022/115425, filed on Aug. 29, 2022, which claims priority to Chinese Patent Application No. 202111284471.6, filed on Nov. 1, 2021. The disclosures of both of the aforementioned application are hereby incorporated by reference in their entireties.

TECHNICAL FIELD

This application relates to the field of data processing technologies, and in particular, to a sensor data processing method, an electronic device, and a readable storage medium.

BACKGROUND

Nowadays, a plurality of sensors, such as an acceleration sensor and a gyroscope, are mounted on electronic devices such as a smartphone and a tablet computer. These sensors may usually output sensor data to different applications in a hardware interrupt manner, so that the applications implement specific functions. Specifically, a first input first output (First Input First Output, FIFO) memory in a sensor receives and caches, based on an output data rate (Output Data Rate, ODR), each frame of sensor data that is output, and then outputs a hardware interrupt request to a processor based on a fixed hardware interrupt rate, and outputs a group of cached sensor data to the processor. Each time the processor receives the hardware interrupt request, the processor reads a group of sensor data output by the sensor, performs data processing such as filtering on the read sensor data, and provides the data to an application at an application layer to process, to implement a specific function.

However, many sensors have clock errors, resulting in a large ODR error. However, an upper-layer application has a requirement for precision of the ODR. When the ODR is inaccurate, after the application uses sensor data with a relatively large ODR error, a specific function of the application will be faulty, and even a function will fail. For example, when the ODR error is relatively large, some step counting applications will have the problem of inaccurate step counting.

SUMMARY

This application provides a sensor data processing method, an electronic device, and a readable storage medium, so as to resolve a problem that a sensor has a relatively large ODR error.

To achieve the foregoing objective, this application provides the following technical solutions.

According to a first aspect, this application discloses a sensor data processing method, applied to an electronic device. The sensor data processing method includes: obtaining a group of raw sensor data, where the raw sensor data is sensor data output, based on an actual output data rate ODR, by a sensor; and obtaining a group of target sensor data through calculation based on the group of raw sensor data, a target ODR, and the actual ODR, where the target sensor data is estimated sensor data output, based on the target ODR, by the sensor, and the target sensor data is used to implement a specific function of an application.

In this embodiment of this application, the group of target sensor data is obtained through calculation based on the group of raw sensor data, the target ODR, and the actual ODR, where the target sensor data is corresponding sensor data estimated when output, based on the target ODR, by the sensor, and can be used to meet an ODR requirement of a target application. When the application uses the group of target sensor data to implement the specific function, no function fails or no functional fault occurs.

In a possible implementation, before the obtaining a group of target sensor data through calculation based on the group of raw sensor data, a target ODR, and the actual ODR, an actual ODR of the sensor may be further determined.

In another possible implementation, that an actual ODR of the sensor may be determined includes: obtaining the actual ODR of the sensor through calculation based on a time length of the group of raw sensor data and a quantity of entries in the group of raw sensor data.

In another possible implementation, the time length of the group of raw sensor data is a difference between an output timestamp corresponding to the group of raw sensor data and an output timestamp corresponding to a previous group of raw sensor data.

That is, the difference between the output timestamp corresponding to the current group of raw sensor data and the output timestamp corresponding to the previous group of raw sensor data is a time length of the current group of raw sensor data. The time length of the current group of raw sensor data refers to a time length of outputting the current group of raw sensor data.

In another possible implementation, the obtaining a group of target sensor data through calculation based on the group of raw sensor data, a target ODR, and the actual ODR includes: obtaining the group of target sensor data by using an interpolation algorithm based on the group of raw sensor data, the target ODR, and the actual ODR.

In this embodiment of this application, when the group of raw sensor data, the target ODR, and the actual ODR are known, target sensor data obtained at the target ODR may be estimated by using the interpolation algorithm.

In another possible implementation, the obtaining the group of target sensor data by using an interpolation algorithm based on the group of raw sensor data, the target ODR, and the actual ODR includes: obtaining a total quantity of the data entries in the group of target sensor data through calculation based on the time length of the group of raw sensor data and the target ODR, where the time length of the group of raw sensor data is a ratio of the total quantity of the data entries in the group of raw sensor data to the actual ODR; and obtaining the group of target sensor data through calculation, after the actual ODR, the target ODR, the time length of the group of raw sensor data, the total quantity of the data entries in the group of raw sensor data, the total quantity of the data entries in the group of target sensor data, and the group of raw sensor data are substituted into the interpolation algorithm.

In another possible implementation, after the obtaining a group of target sensor data through calculation based on the group of raw sensor data, a target ODR, and the actual ODR, the group of target sensor data is further sent to an application, so that the application uses the group of target sensor data to implement a specific function.

In this embodiment of this application, the target sensor data sent to the application is the corrected sensor data obtained at the target ODR. Therefore, when the application uses the group of target sensor data to implement the specific function, the specific functional fault is not caused when there is an ODR error.

In another possible implementation, before the group of target sensor data is sent to an application, the method further includes: obtaining a group of processed target sensor data by performing filtering processing on the group of target sensor data; and sending the group of processed target sensor data to the application, so that the application uses the group of processed target sensor data to implement a specific function.

That is, filtering processing is performed on the group of target sensor data before being sent to the application, so that the target sensor data is more accurate and is then sent to the application for use.

According to a second aspect, this application discloses an electronic device, including: one or more sensors, configured to output raw sensor data to a processor; one or more processors; and a memory, where a program is stored in the memory. When the program is executed by the one or more processors, the electronic device is enabled to perform the sensor data processing method according to any one of the first aspect.

According to a third aspect, this application discloses a readable storage medium, where a computer program is stored on the readable storage medium, and the computer program is executed by a processor to perform the sensor data processing method according to any one of the first aspect.

DETAILED DESCRIPTION OF ILLUSTRATIVE EMBODIMENTS

Figure 1:
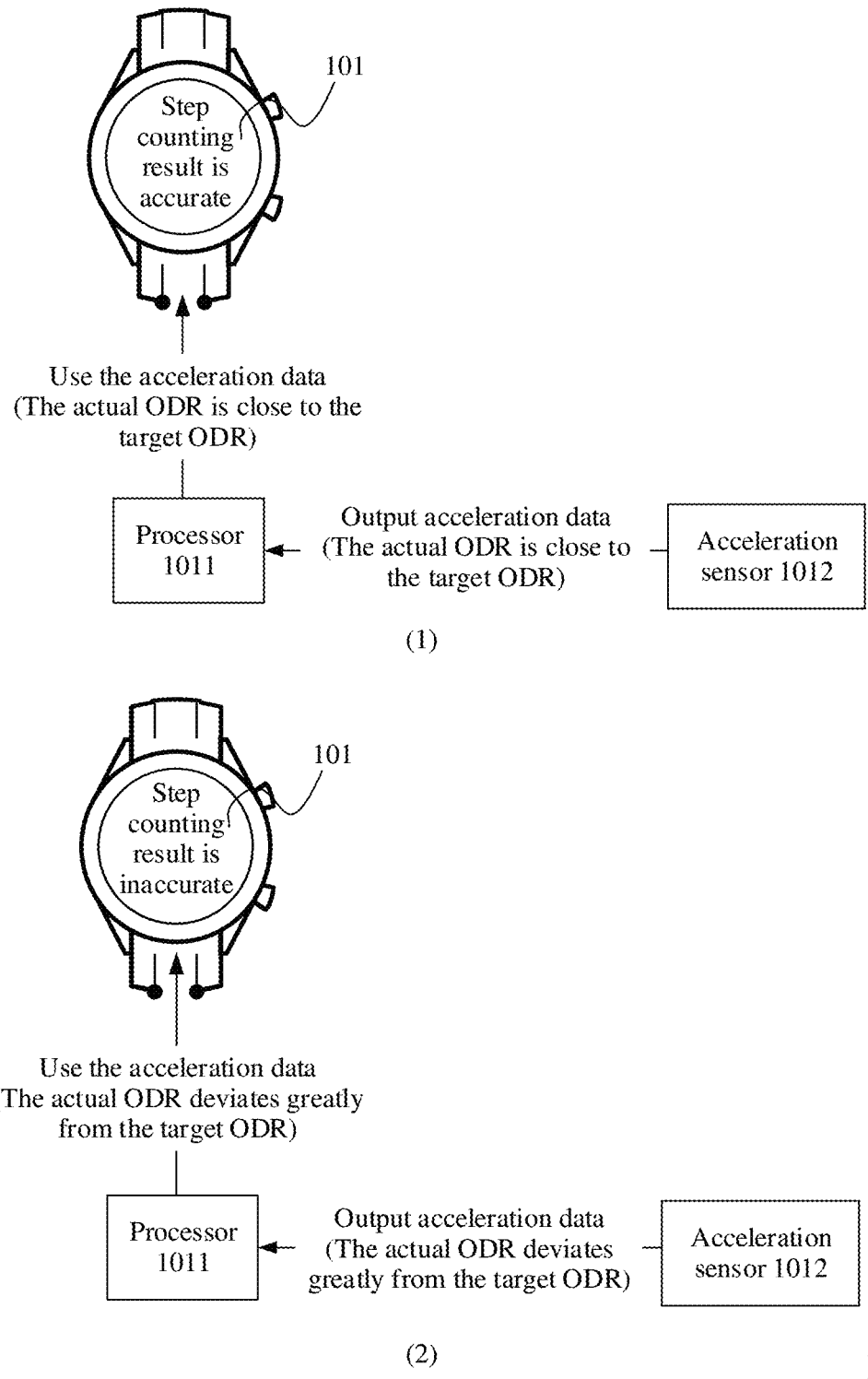
FIG. 1 is a diagram showing a scenario in which a smartwatch implements a step counting function.

In the specification, claims, and accompanying drawings of this application, the terms "first", "second", and "third", and the like are intended to distinguish between different objects but not to limit a particular order.

In embodiments of this application, the word such as "as an example" or "for example" is used to represent giving an example, an illustration, or a description. Any embodiment or design scheme described as "as an example" or "for example" in embodiments of this application should not be explained as being preferred or having more advantages than another embodiment or design scheme. To be precise, the use of the word such as "as an example" or "for example" is intended to present a related concept in a specific manner.

Manners in which a processor in an electronic device read sensor data mainly include hardware interrupt, software polling, and the like. When the electronic device reads the sensor data in the software polling manner, precision of an ODR mainly relies on clock precision of the processor, and therefore the ODR is relatively accurate. However, when the sensor data is read in the hardware interrupt manner, the precision of an ODR mainly relies on precision of a sensor clock system.

The ODR may be understood as a quantity of frames of sensor data output in a unit of time. For example, when the ODR is 10 Hz, a FIFO memory in a sensor receives 10 frames of the sensor data every second. However, a rate of the hardware interrupt output by the sensor may be different from the ODR. For example, the sensor may generate a hardware interrupt every second. When the ODR is 10 Hz, FIFO outputs a hardware interrupt to the processor when caching 10 frames of sensor data.

The ODR error of the sensor is mainly caused by the clock system error of the sensor. Specifically, the clock precision of the sensor is mainly affected by an error of an oscillator in the sensor. The oscillator inside the sensor usually includes an RC oscillator circuit. Although costs are low, the precision is usually low. In the RC oscillator circuit, a resistance value error is usually 5%, and a capacitance error can be up to 20%. Consequently, a clock precision of the sensor is poor, and this affects the precision of the ODR. ODRs in some sensors can even be up to 10%.

When the sensor has a relatively large ODR error, it indicates that the actual ODR when the sensor outputs the sensor data is different from the raw ODR calibrated by the sensor. However, algorithms, models, and the like in some applications are applicable only to sensor data output based on a target ODR. The target ODR is an ODR of a sensor required by an upper-layer application. Although the target ODR is usually the same as the ODR calibrated by the sensor, when the sensor has a relatively large ODR error, the actual ODR of the data output by the sensor is quite different from the target ODR, that is, the sensor does not output the sensor data based on the target ODR, and consequently, performance of some applications may become poor, and even a functional fault may occur.

For example, the smartwatch 101 shown in FIG. 1 includes a processor 1011 and an acceleration sensor 1012. The acceleration sensor 1012 outputs acceleration data to the processor 1011 in the hardware interrupt manner. A step counting application run by the processor 1011 uses the output acceleration data, and extracts a gait feature from the acceleration data by using a step counting algorithm, to implement a step counting function. The step counting algorithm in the step counting application is suitable for processing acceleration data output based on the ODR of 75 Hz, that is, the target ODR is 75 Hz. As shown in (1) in FIG. 1, an actual ODR of data output by the acceleration sensor 1012 is close to a target ODR, and the actual ODR is 74 Hz. Therefore, the processor 1011 can normally implement a step counting function. After processing by the processor 1011, the step counting displayed on the display interface of the smartwatch 101 is accurate. In the scenario shown in (2) in FIG. 1, the acceleration sensor 1012 has a relatively large ODR error. An actual ODR is 69 Hz, and when data is output, an actual ODR deviates greatly from a target ODR. However, a step counting application running in the processor 1011 is not suitable for processing acceleration data whose ODR is 69 Hz. Therefore, after the processor uses the acceleration data, a step counting result displayed on the display interface of the smartwatch 101 is inaccurate.

In addition to the smartwatch shown in FIG. 1, the problem of a functional fault caused by a relatively large ODR error of the sensor also exists in electronic devices such as a mobile phone and a tablet computer, which is not enumerated in this embodiment of this application.

To enable an upper-layer application to normally implement a specific function, in the sensor data processing method provided in this embodiment of this application, sensor data obtained at an actual ODR is corrected to obtain sensor data in a target ODR, and then the sensor data obtained at the target ODR through correction is provided for the upper-layer application to use.

The sensor data processing method provided in this embodiment of this application may be applied to electronic devices such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, a smartwatch, head mounted virtual reality (Virtual Reality, VR) glasses, a medical device, and a sensor with an internal integrated processor.

Figure 2:
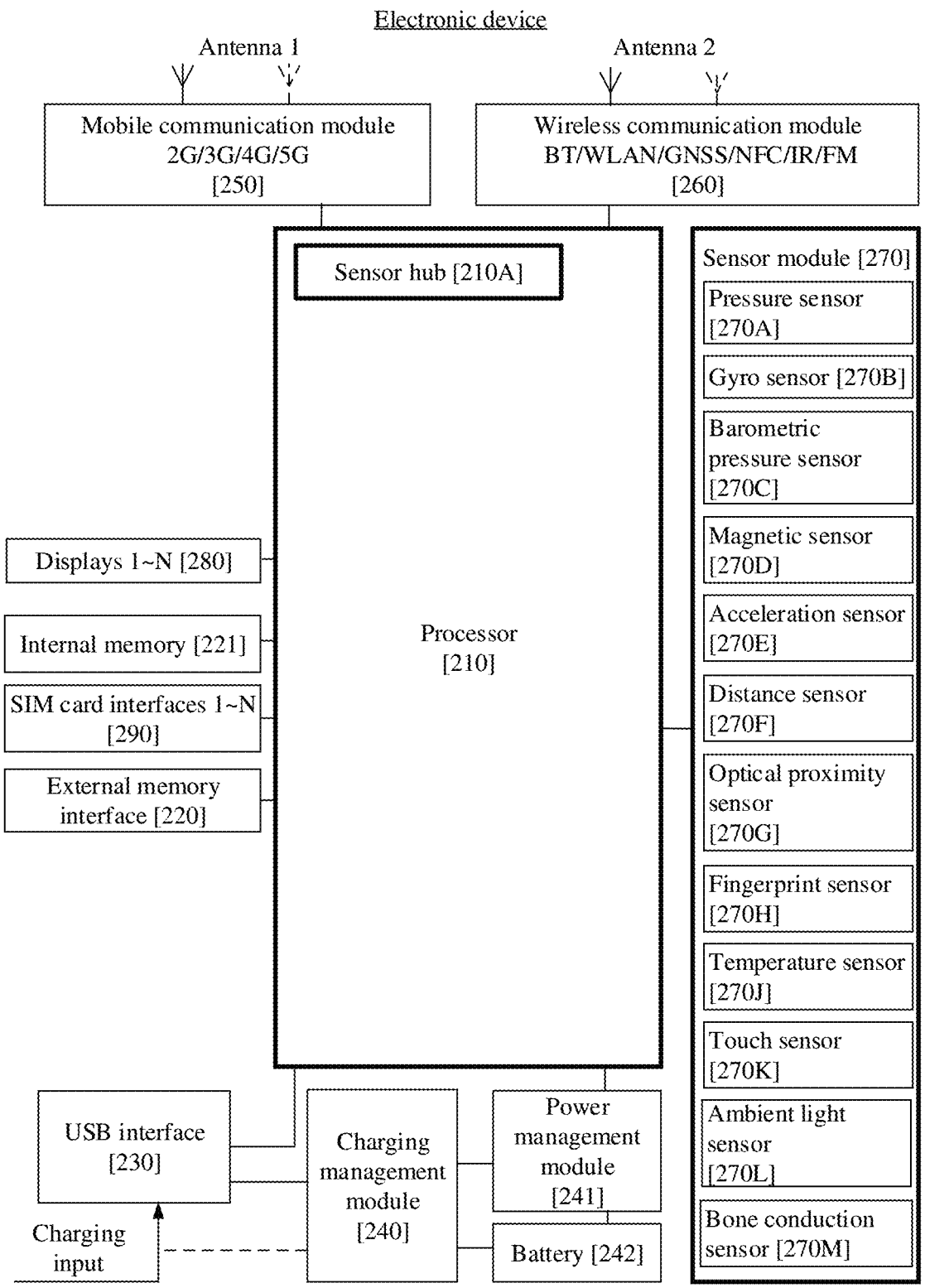
FIG. 2 is a diagram of a hardware structure of an electronic device according to an embodiment of this application.

As shown in FIG. 2, the electronic device in this embodiment of this application may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, a sensor module 270, a display 280, a subscriber identification module (subscriber identification module, SIM) card interface 290, and the like. The sensor module 270 may include a pressure sensor 270A, a gyro sensor 270B, a barometric pressure sensor 270C, a magnetic sensor 270D, an acceleration sensor 270E, a distance sensor 270F, an optical proximity sensor 270G, a fingerprint sensor 270H, a temperature sensor 270J, a touch sensor 270K, an ambient light sensor 270L, a bone conduction sensor 270M, and the like.

It can be understood that the structure shown in this embodiment does not constitute a specific limitation on the electronic device. In some other embodiments, the electronic device may include more or fewer components than those shown in the figure, combine some components, split some components, or have different component arrangements. The illustrated components may be implemented by using hardware, software or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be independent devices, or may be integrated into one or more processors. For example, in this application, the processor 210 may obtain a group of raw sensor data output by the sensor module 270, and then use the group of raw sensor data to perform any sensor data processing method provided in this embodiment of this application. For an execution process and a principle of the sensor data processing method, refer to the following related part in FIG. 4.

The controller may be a nerve center and a command center of the electronic device. The controller may generate an operation control signal based on an instruction operation code and a time sequence signal, to control instruction reading and instruction execution.

The processor 210 may further include a sensor hub (Sensor hub) 210A, configured to be connected to various sensor modules 270 and process sensor data from the sensor modules 270. For example, in this embodiment of this application, the sensor hub 210A is connected to the sensor module 270 and receives a group of raw sensor data from the sensor module 270, and performs, based on the group of raw sensor data, any sensor data processing method provided in this embodiment of this application. For a specific execution process and principle, refer to the following description and the processing method for sensor data in FIG. 4. Details are not described herein again.

The processor 210 may further be provided with a memory for storing an instruction and data. In some embodiments, the memory may store an instruction or data that has just been used or is cyclically used by the processor 210. If the processor 210 needs to use the instruction or the data again, the processor 210 may directly invoke the instruction or the data from the memory, In some embodiments, the processor 210 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, and the like.

It can be understood that the interface connection relationship between the modules illustrated in embodiments is merely an example for description, and does not constitute a limitation on the structure of the electronic device. In some other embodiments of this application, the electronic device may alternatively use an interface connection mode that is different from those in the foregoing embodiments, or use a combination of a plurality of interface connection modes.

The charging management module 240 is configured to receive charging input from a charger. The charger may be a wireless charger, or may be a wired charger.

The power management module 241 is configured to connect the battery 242, the charging management module 240, and the processor 210. The power management module 241 receives input from the battery 242 and/or input from the charging management module 240, and supplies power to the processor 210, the internal memory 221, the display 280, the wireless communication module 260, and the like.

A wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals.

The mobile communication module 250 may provide a solution to wireless communication such as 2G/3G/4G/5G applied to the electronic device.

The wireless communication module 260 may provide a wireless communication solution that is applied to the electronic device including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology applied to the electronic device, and the like.

The display 280 is configured to display an image, a video, and the like.

The external memory interface 220 may be configured to connect to an external memory card, such as a micro SD card, to extend a storage capacity of the electronic device. The external memory card communicates with the processor 210 by using the external memory interface 220, to implement a data storage function. For example, files such as music and videos can be stored in the external memory card.

The internal memory 221 may be configured to store computer executable program code, where the executable program code includes instructions. The processor 210 executes various function applications and data processing of the electronic device by running an instruction stored in the memory 221. For example, in this embodiment, the processor 210 may implement, by executing an instruction stored in the internal memory 221, any sensor data processing method provided in this embodiment of this application. For a specific execution process and principle, refer to the following description and the processing method for sensor data in FIG. 4. Details are not described herein again.

The pressure sensor 270A is configured to sense a pressure signal, and can convert the pressure signal into an electrical signal.

The gyro sensor 270B may be configured to determine a movement posture of the electronic device.

The barometric pressure sensor 270C is configured to measure a barometric pressure. In some embodiments, the electronic device calculates an altitude based on a barometric pressure value that is measured by the barometric pressure sensor 270C, to assist in positioning and navigation.

The magnetic sensor 270D includes a Hall sensor. The electronic device may detect opening and closing of a flip holster by using the magnetic sensor 270D.

The acceleration sensor 270E can detect magnitudes of acceleration of the electronic device in all directions (generally three axes).

The distance sensor 270F is configured to measure a distance.

The optical proximity sensor 270G may include, for example, a light emitting diode (LED) and a photodetector, for example, a photodiode.

The ambient light sensor 270L is configured to sense brightness of ambient light. The electronic device can adaptively adjust luminance of the display 280 based on the sensed luminance of the ambient light.

The fingerprint sensor 270H is configured to collect a fingerprint. The electronic device can use the collected fingerprint characteristics to implement fingerprint-based unlocking, application lock accessing, fingerprint-based photographing, fingerprint-based incoming call answering, and the like.

The temperature sensor 270J is configured to detect a temperature. In some embodiments, the electronic device performs a temperature processing strategy based on a temperature that is detected by the temperature sensor 270J.

The touch sensor 270K is also referred to as a "touch device". The touch sensor 270K is configured to detect a touch operation performed on or near the touch sensor 270K. The touch sensor can transmit a detected touch operation to the application processor to determine a type of a touch event.

The bone conduction sensor 270M may obtain a vibration signal. In some embodiments, the bone conduction sensor 270M may obtain a vibration signal of a vibration bone of a human vocal-cord part. The bone conduction sensor 270M may also contact a human pulse, to receive a blood pressure beating signal. In some embodiments, the application processor can parse heart rate information based on the blood pressure and pulse signal obtained by the bone conduction sensor 270M, to implement a heart rate detection function.

In this embodiment, any one or more sensors in the sensor module 270 may output a group of raw sensor data to the processor 210. For a specific process, refer to related content of step S401 in FIG. 4. Details are not described herein again.

The SIM card interface 290 is configured to connect to a SIM card. The SIM card may be inserted into the SIM card interface 290 or pulled out of the SIM card interface 290, so that the SIM card is in contact with or separated from the electronic device. The electronic device may support one or N SIM card interfaces, where N is a positive integer greater than 1.

In addition, an operating system runs on the foregoing components. For example, the iOS operating system, the Android open source operating system, the Windows operating system, and the Harmony system. An application may be installed and run on the operating system.

An operating system of the electronic device may use a layered architecture, an event-driven architecture, a micro-kernel architecture, a micro-service architecture, or a cloud architecture. In this embodiment of this application, an Android system with the layered architecture is used as an example to describe a software architecture of the electronic device.

Figure 3:
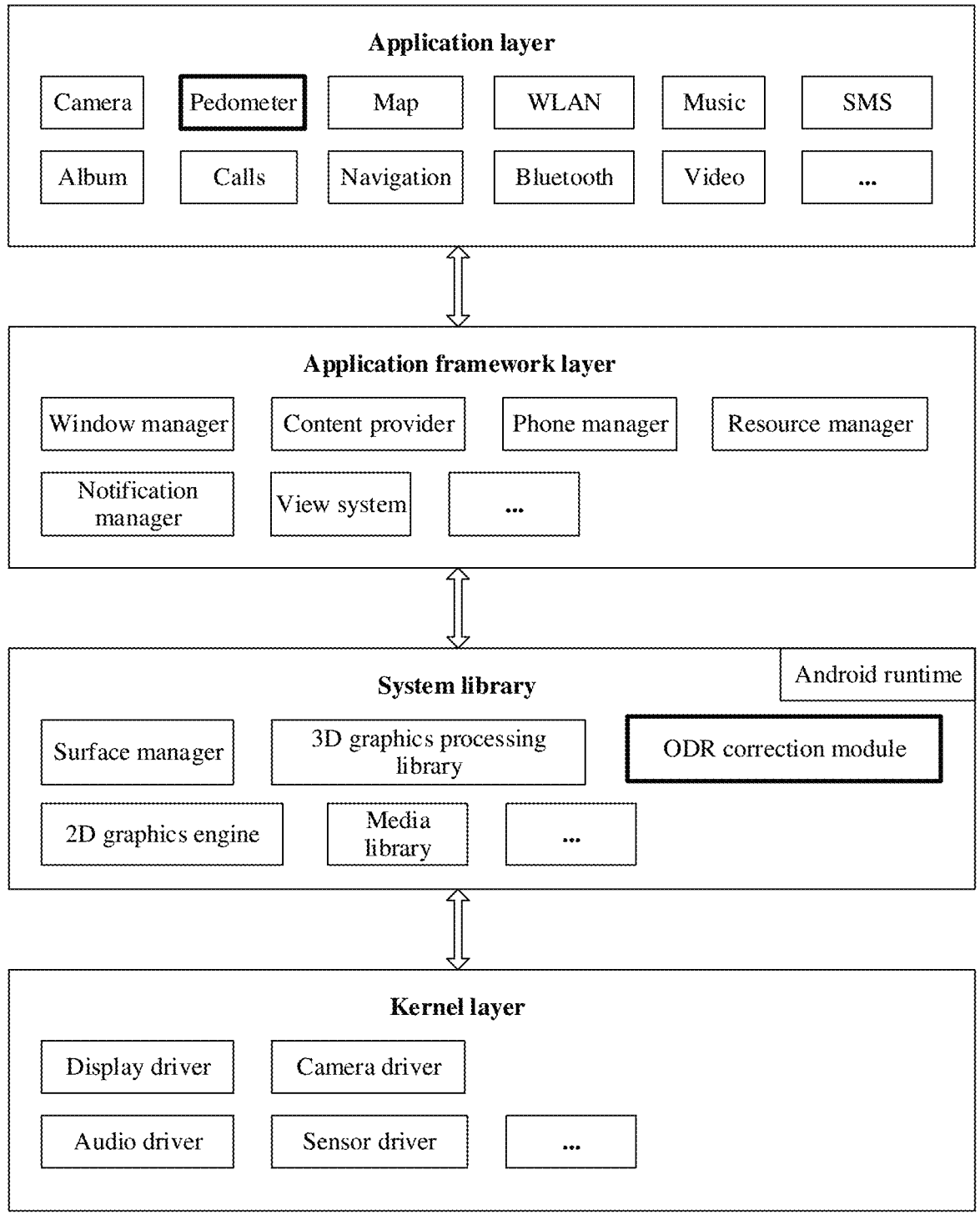
FIG. 3 is a diagram of an example of a software architecture of an electronic device according to an embodiment of this application.

FIG. 3 is a block diagram of a software architecture of an electronic device according to an embodiment of this application.

The layered architecture divides software into several layers, and each layer has a clear role and division of labor. The layers communicate with each other by using software interfaces. In some embodiments, the Android system is divided into four layers: an application layer, an application framework layer, an Android runtime (Android runtime) and system library, and a kernel layer from top down.

The application layer may include a series of application packages. As shown in FIG. 3, the application packages may include applications such as camera, gallery, calls, map, navigation, WLAN, Bluetooth, music, video, and SMS. For example, in this embodiment of this application, the application package may further include a pedometer. A group of target acceleration data obtained by an ODR correction module may be provided to the pedometer, and the pedometer application package implements a step counting function by using the group of target acceleration data.

The application framework layer provides an application programming interface (application programming interface, API) and a programming framework for applications at the application layer. The application framework layer includes some predefined functions. As shown in FIG. 3, the application framework layer may include a window manager, a content provider, a view system, a phone manager, a resource manager, notification manager, and the like.

The window manager is configured to manage a window program. The window manager may obtain a display size, determine whether there is a status bar, lock a screen, take a screenshot, and the like.

The content provider is configured to store and obtain data, and enable these data to be accessible to an application. The data may include videos, images, audio, calls that are made and answered, browsing histories and bookmarks, phone books, and the like.

The view system includes visual controls, such as a control for displaying text and a control for displaying pictures. The view system may be configured to construct an application. A display interface may include one or more views.

The phone manager is configured to provide a communication function of an electronic device, for example, call status management (including answering, hanging up, or the like).

The resource manager provides resources for the applications, such as a localized string, an icon, a picture, a layout file, and a video file.

The notification manager enables an application to display notification information in the status bar, which can be used to convey a notification-type message, and can automatically disappear after a short stay without user interaction.

The Android runtime includes a core library and a virtual machine. The Android runtime is responsible for scheduling and management of the Android system.

The core library includes two parts: one is a functional function that needs to be invoked by a java language, and the other is a core library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, such as a surface manager (surface manager), a media library (Media Libraries), three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports a plurality of common audio and video formats for playback and recording, as well as still image files. The media libraries may support a plurality of audio and video encoding formats, such as MPEG4, H.264, MP3, AAC, AMR, JPG, and PNG.

The 3D graphics processing library is used to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver. In this embodiment of this application, the kernel layer may further include an ODR correction module. The ODR correction module may perform any sensor data processing method provided in this embodiment of this application, to obtain a group of target sensor data, and then provide the target sensor data to an application at the application layer. For example, the ODR correction module may obtain a group of target acceleration data by performing any sensor data processing method provided in this embodiment of this application, and provide the target acceleration data to a pedometer application.

Figure 4:
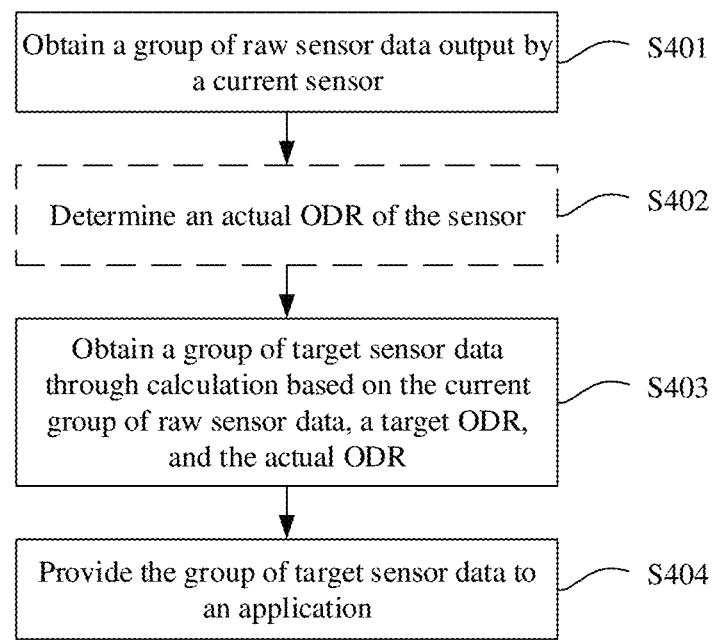
FIG. 4 is a flowchart of a sensor data processing method according to an embodiment of this application.

For details, refer to description about the sensor data processing method shown in FIG. 4. Details are not described herein again. It should be noted that the ODR correction module may further be at the application framework layer or in the system library. A position of the ODR correction module in a software framework is not limited in this embodiment of this application.

It should be noted that, although the Android system is used as an example for description in this embodiment of this application, a basic principle thereof is also applicable to an electronic device based on an operating system such as the Harmony (Harmony), the iOS, or the Windows.

Referring to FIG. 4, an embodiment of this application provides a sensor data processing method, which is applied to the foregoing electronic device in this embodiment of this application and specifically includes the following steps:

S401: Obtain a group of raw sensor data output by a current sensor.

For brevity, in this embodiment of this application, an array A[m] is used to represent a group of raw sensor data output by a current sensor, where m is a quantity of output sensor data entries. For example, when the sensor is an acceleration sensor, and the group of output sensor data A[m] is 10 frames of x-axis acceleration data, m is 10. A group of raw sensor data in this embodiment of this application refers to a group of raw sensor data of a same data type. For example, the group of raw sensor data of a same data type may be a group of acceleration data of an x-axis, or may be a group of acceleration data of a y-axis. In this embodiment of this application, the data type of the group of raw sensor data is not limited. The raw sensor data in this embodiment of this application refers to sensor data that is output by the sensor and that is not adjusted, or may be understood as sensor data output, based on an actual ODR, by the sensor.

Sensor data in the array A[m] output by the sensor is arranged in a time sequence output by the sensor. Specifically, in the electronic device, after FIFO inside the sensor caches m frames of sensor data in a time sequence in which the m frames of sensor data are output to a FIFO memory, the FIFO memory outputs the m frames of sensor data to the processor. The processor may obtain a group of sensor data A[m] arranged in a time sequence.

In some embodiments, a process of performing step S401 may be: A sensor in an electronic device outputs a plurality of groups of raw sensor data to a processor based on a preset hardware interrupt rate. When the sensor sends a hardware interrupt request to the processor, after the processor in the electronic device currently receives the hardware interrupt request output by the sensor, in response to the hardware interrupt request, a group of raw sensor data A[m] output by the sensor is read in the hardware interrupt request, and the A[m] is obtained.

For description about the technical principle of the processor, refer to the processor 210 shown in FIG. 2. Details are not described herein again. A specific type and function of a sensor are not limited in this embodiment of this application, for example, the sensor may be any sensor in the sensor module 270 shown in FIG. 2. In some other embodiments, the processor may obtain the array A[m] by using the ODR correction module. For description about the technical principle of the ODR correction module, refer to a related part of the ODR correction module shown in FIG. 3. Details are not described herein again.

In some other embodiments, in step S401, in addition to obtaining the array A[m], an output timestamp corresponding to the array A[m] is also obtained. The output timestamp corresponding to the array A[m] refers to a time when the sensor outputs the array A[m].

S402: Determine an actual ODR of the sensor.

The actual ODR refers to a rate at which the sensor actually outputs the sensor data. When the sensor has an ODR error, the actual ODR of the sensor may not be equal to an ODR calibrated by the sensor. Therefore, the actual ODR of the sensor needs to be determined.

In some embodiments, an implementation of step S402 is to obtain an actual ODR through calculation based on a time length corresponding to the array A[m] and a total quantity of data entries in the array A[m]. For example, an output timestamp corresponding to the current group of raw sensor data may be subtracted from an output timestamp corresponding to the previous group of raw sensor data, to obtain a time length corresponding to the array A[m] through calculation. The time length corresponding to the array A[m] may be understood as a time length corresponding to the current group of raw sensor data output by the sensor. Then, a total quantity of the data entries in the current group of raw sensor data is divided by the time length corresponding to the array A[m], to obtain an actual ODR, that is, a total quantity of sensor data entries output per second by the sensor. For example, if an output timestamp of the previous group of raw sensor data output by the sensor to the processor is 16:00, and an output timestamp of the current group of raw sensor data output by the sensor is 16:01, a time length corresponding to the current group of raw sensor data output by the sensor to the processor is 1 minute, and when a quantity of data entries the current group of raw sensor data is 120, an actual ODR is calculated to be equal to 120 divided by 60, that is, 2 Hz. In this embodiment, after step S401 is completed each time, a current actual ODR of the sensor needs to be recalculated once, to calculate precision of the actual ODR in advance.

In some other embodiments, the actual ODR of the sensor may also be pre-obtained through calculation of a historical time length and a total quantity of data entries output by the sensor in the historical time length. For example, an actual ODR is obtained through calculation by dividing the total quantity of data entries output by the sensor in the historical time length by the historical time length. For example, the historical time length may be determined by using any two historical output timestamps. The historical time length can be obtained by calculating a difference between any two historical output timestamps. The historical output timestamp is a time when a group of sensor data is output in history. However, the total quantity of data entries output by the sensor in the historical time length may be understood as a total quantity of raw sensor data entries output between the foregoing two historical output timestamps.

For example, an output timestamp of a third group of raw sensor data is 16:00, and an output timestamp of a fifth group of raw sensor data is 16:01. Therefore, a difference between two historical output timestamps is 60 seconds, and a total quantity of raw sensor data entries between 16:00 and 16:01 is a total quantity of a fourth group of data and the fifth group of data. The fourth group of data and the fifth group of data have a total of 100. Therefore, the actual ODR is 1.67 Hz. Because the actual ODR may be pre-obtained through calculation, after step S401 is performed, step S402 may not be performed, that is, the actual ODR does not need to be re-determined. A specific quantity of the plurality of groups of continuously output raw sensor data and a manner of selecting the plurality of groups of continuously output raw sensor data may not be limited.

When a clock system error of the sensor is larger, a difference between the calculated actual ODR and the ODR calibrated by the sensor is larger; or when an ODR error of the sensor is smaller, the difference between the calculated actual ODR and the ODR calibrated by the sensor is smaller.

S403: Obtain a group of target sensor data through calculation based on the current group of raw sensor data, a target ODR, and the actual ODR.

The target sensor data is corresponding sensor data estimated when output, based on the target ODR, by the sensor. The target ODR is an ODR of sensor data required by an upper-layer application in the electronic device, and the target ODR may be equal to an ODR calibrated by the sensor, or may not be equal to an ODR calibrated by the sensor. The target ODR may be a value preset based on a requirement of the application, and a value of the target ODR may be adjusted based on the requirement of the application.

That the array A[m] is a group of sensor data output, based on an actual ODR rate, by the sensor, is known, and the sensor data in the array A[m] is arranged in a time sequence in which the sensor data in the array A[m] is output. Further, the data in the array A[m] may be fitted into a curve based on an actual ODR rate. The curve is equivalent to a change curve of the sensor data in a time period in which the raw sensor data in the A[m] is cached. However, on the change curve, it may be obtained, when the ODR of the sensor is a target ODR, that an array B[n] in the time period is a group of target sensor data. For brevity, a group of target sensor data is referred to as B[n] below. n is a quantity of data entries output, based on a target ODR rate, by the sensor, in a time period in which the sensor outputs the current group of raw sensor data.

Figure 5:
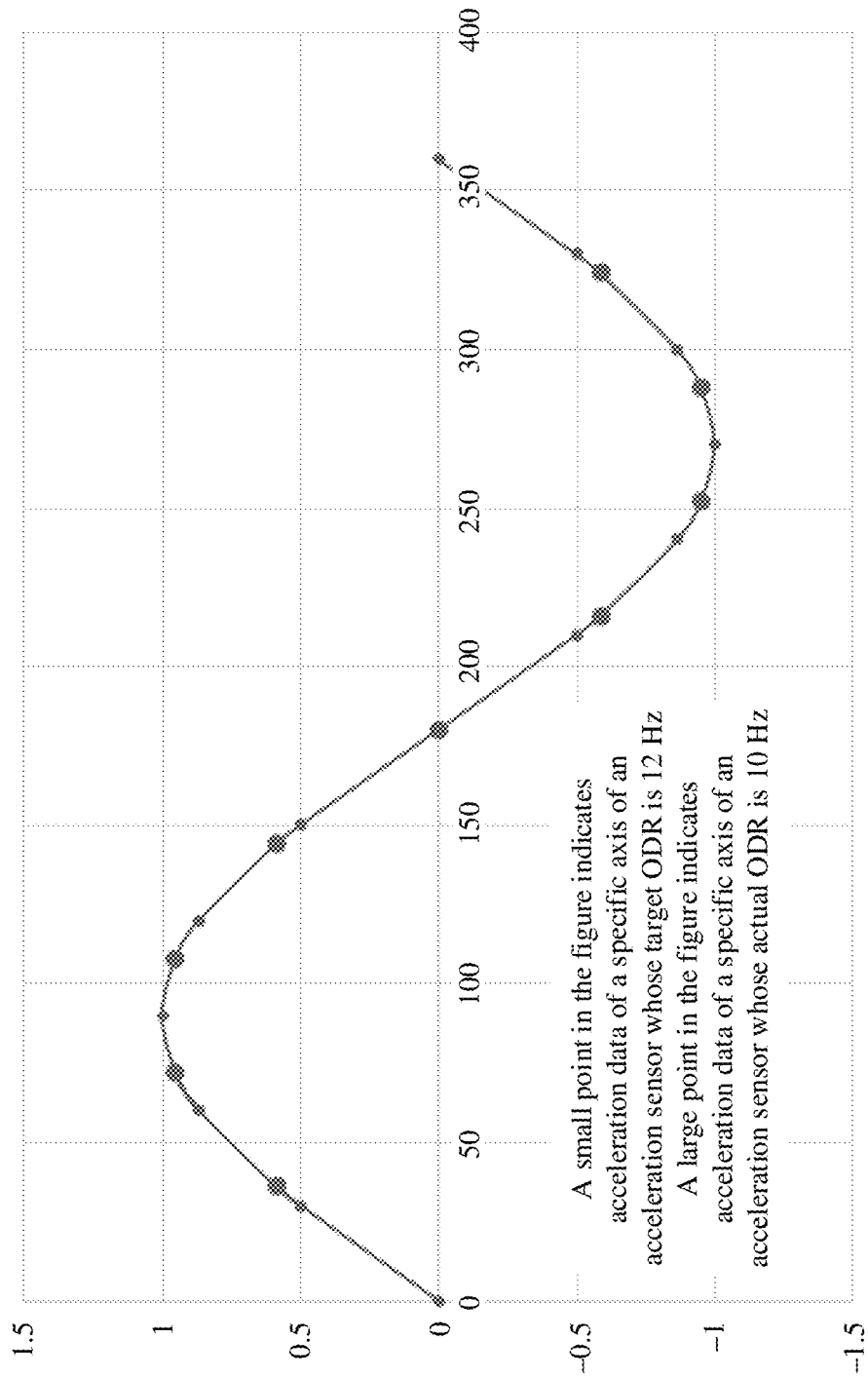
FIG. 5 is a diagram showing a change curve of sensor data obtained at both a target ODR and an actual ODR according to an embodiment of this application.

For example, as shown in FIG. 5, when the array A[m] is acceleration data of an axis of the acceleration sensor, and the actual ODR is 10 Hz, a large point in FIG. 5 may be drawn in an equal time interval based on an arrangement sequence of acceleration data in the A[m]. A horizontal coordinate is the time, and a vertical coordinate is the acceleration data. In FIG. 5, a curve fitted by connecting each large point may be understood as a change curve of acceleration data in a time period in which a sensor outputs data in the A[m]. When the target ODR is 12 Hz, on a curve in the time period for outputting data in the A[m], a plurality of small points may be selected based on the target ODR, and acceleration data corresponding to the series of small points is an array B[n], namely, the target sensor data.

It may be learned from the foregoing description that a process of obtaining the group of target sensor data through calculation may be simplified to be a process in which an array A[m] and an actual ODR corresponding to the array A[m] are known to obtain an array B[n] that is output at the target ODR and that follows a same change curve as the array A[m].

Figure 6:
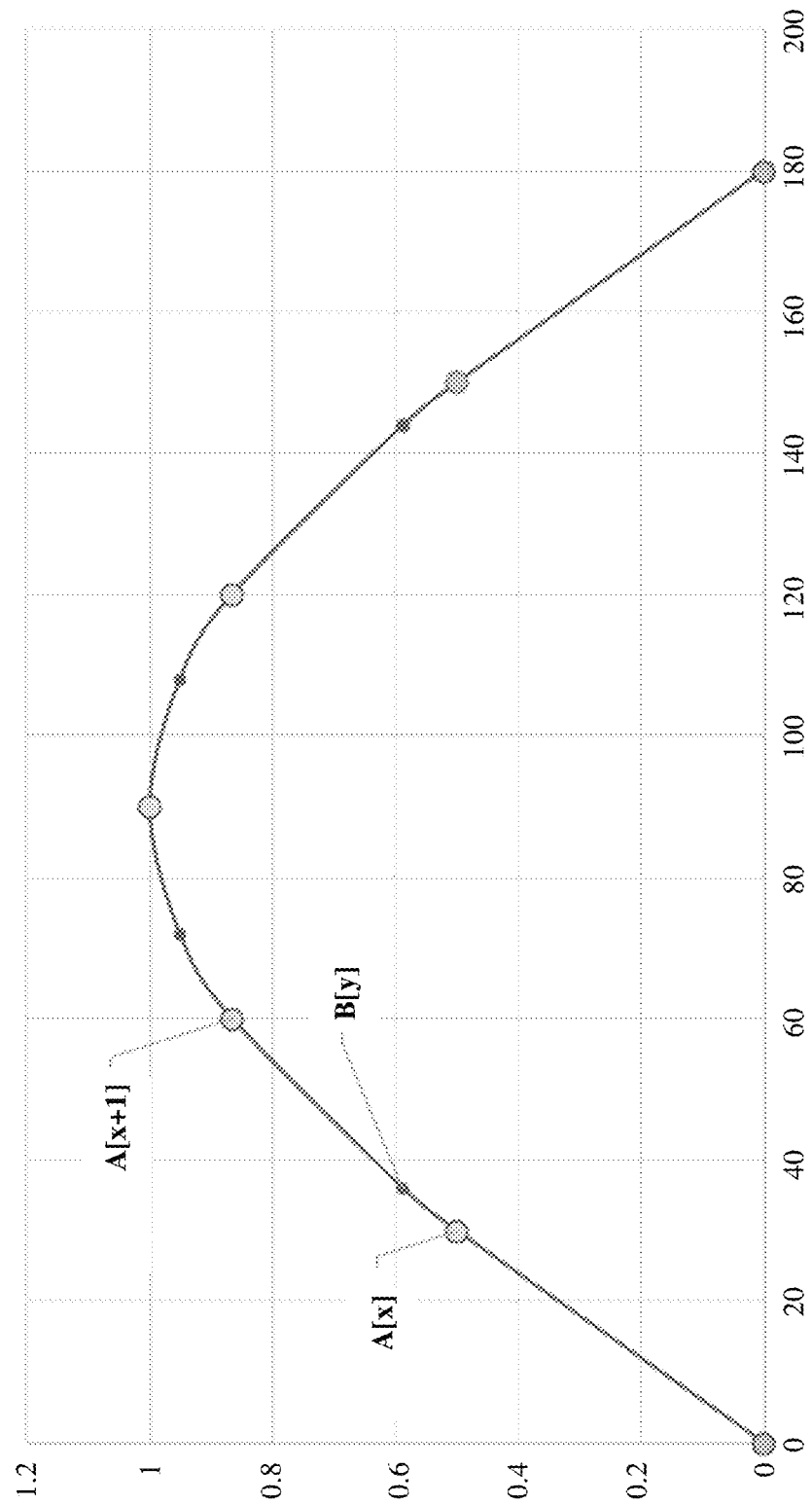
FIG. 6 is a diagram showing a relationship between A[x], A[x+1], and B[y] according to an embodiment of this application.

For example, each target sensor data entry in the array B[n] may be calculated by using the array A[m], the actual ODR, and the target ODR by using an interpolation algorithm. As shown in FIG. 6, a large point in FIG. 6 is data A[m] output based on an actual ODR, and a small point is an estimated array B[n] output based on a target ODR. For any data B[y] in the array B[n], B[y] is located between A[x] and A[x+1] in the data A[m]. Therefore, the value of B[y] can be output by using the interpolation algorithm. In this embodiment of this application, m, n, x, and y are natural numbers, where m≥x≥0 and n≥y≥0.

For example, each target sensor data entry in the array B[n] may be calculated by using a linear function interpolation algorithm.

Specifically, a process of calculating the array B[n] by using the linear function interpolation algorithm is as follows:

first obtaining a time length δt of the array A[m], where δt may be understood as a length of a period of time when a sensor outputs raw sensor data in the A[m]. In this embodiment of this application, the time length δt of the array A[m] is the same as a time length of the array B[n]. Therefore, formula 1 may be deduced as follows:

$$\delta t = \frac{n}{Fg} = \frac{m}{Fc},$$

where m is a quantity of raw sensor data entries, n is a quantity of target sensor data entries, Fc is an actual ODR, and Fg is a target ODR.

Further, after formula 1 is transformed, formula 2 may be obtained:

n=[Fg*δt+0.5], where "[ ]" indicates a rounding down function, that is, a maximum integer smaller than a value obtained through calculation is obtained. For example, 3.2 is obtained through calculation, and 3 is obtained.

As shown in FIG. 6, it is assumed that A[x] is an $x^{th}$ element in the array A[m], A[x+1] is an $(x+1)^{th}$ element in an array A[m], and B[y] is on a curve in which two elements A[x] and A[x+1] are connected, A[x] is located at the time point $$t1 = \frac{x}{m},$$

A[x+1] is located at the time point $$t2 = \frac{x+1}{m},$$

and B[y] is located at the time point $$t0 = \frac{y}{n},$$

then t1≤t0≤t2, that is, $$\frac{x}{m} \le \frac{y}{n} \le \frac{x+1}{m},$$

and x is a natural number, $$x = \left[\frac{m*y}{n}\right]$$

is known, where "[ ]" indicates a rounding down function.
Further anal—ysis:
When y=o, B[o]=A[o].
When x≥y>0, B[y] is between curves of A[x] and A[x+1], and formula 3 obtained by simplifying the linear function interpolation method is as follows:

$$B[y] = A[x] + \frac{A[x+1] - A[x]}{t2 - t1} * (t0 - t1).t1 = \frac{x}{m}, t2 = \frac{x+1}{m}, \text{ and } t0 = \frac{y}{n}$$

are substituted into formula 3 to obtain formula 4 as follows:

$$B[y] = A[x] + (A[x+1] - A[x]) * \left(\frac{m*y}{n} - x\right).$$

Then $$x = \left[\frac{m*y}{n}\right]$$

is substituted into formula 4 to obtain formula 5 as follows:

$$B[y] = A\left[\left[\frac{m*y}{n}\right]\right] + \left(A\left[\left[\frac{m*y}{n}\right]+1\right] - A\left[\left[\frac{m*y}{n}\right]\right]\right) * \left(\frac{m*y}{n} - \left[\frac{m*y}{n}\right]\right).$$

Then n=[Fg*δt+0.5] is substituted into formula 5 to obtain formula 6:

$$B[y] = A\left[\left[\frac{m*y}{[Fg*\delta t + 0.5]}\right]\right] + \left(A\left[\left[\frac{m*y}{[Fg*\delta t + 0.5]}\right]+1\right] - A\left[\left[\frac{m*y}{[Fg*\delta t + 0.5]}\right]\right]\right) * \left(\frac{m*y}{[Fg*\delta t + 0.5]} - \left[\frac{m*y}{[Fg*\delta t + 0.5]}\right]\right).$$

When y=o, B[o]=A[o]. When n≥y>0, the array B[n] may be calculated by using formula 6.

It should be noted that, when the actual ODR of the sensor is higher, the target sensor data that is estimated by using the interpolation algorithm is more accurate. The actual ODR is higher, the raw sensor data collected and output within the unit time is more, and the error of the interpolation algorithm is smaller. It should be further noted that formula 6 is only a specific calculation manner of a linear function interpolation algorithm, and there is still a linear function interpolation algorithm in another calculation manner, or a plurality of functions interpolation algorithm and an array B[n] may be obtained through calculation. Details are not described in this embodiment of this application.

It should be further noted that it may be learned from the foregoing process of calculating each target sensor data entry in the array B[n] by using the linear function interpolation algorithm that, in this embodiment of this application, a total quantity n of the data entries in the group of target sensor data B[n] through calculation is obtained, based on the time length δt of the group of raw sensor data A[m] and the target ODR are first obtained. The time length of the group of raw sensor data is a ratio of the total quantity of the data entries in the group of raw sensor data to the actual ODR; and then, the group of target sensor data through calculation is obtained, after the actual ODR, the target ODR, the time length δt of the group of raw sensor data, the total quantity m of the data entries in the group of raw sensor data, the total quantity n of the data entries in the group of target sensor data, and the group of raw sensor data A[m] are substituted into the interpolation algorithm.

Figure 7A:
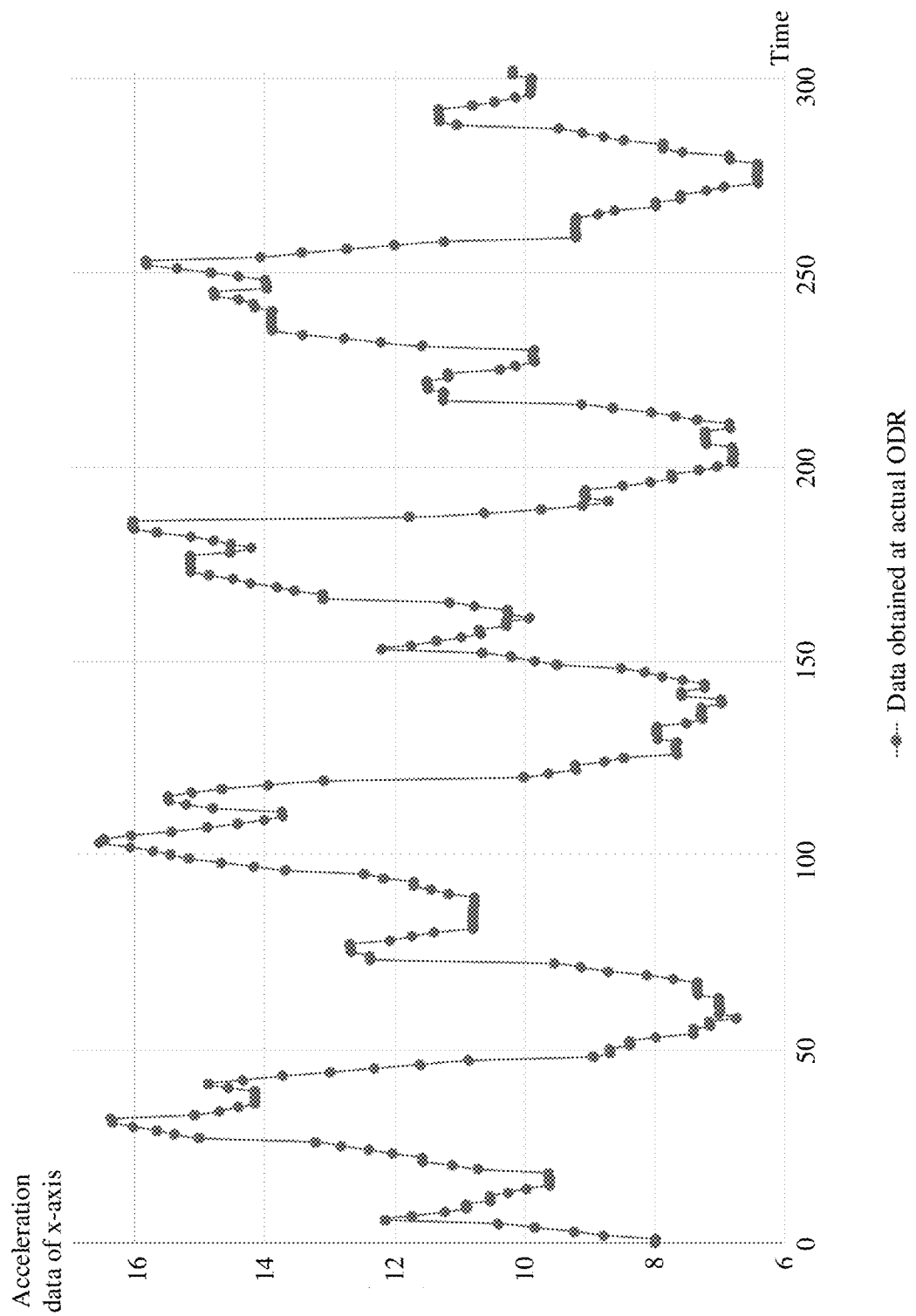
FIG. 7A is a diagram showing a change curve of raw acceleration data of an x-axis of an acceleration sensor in a walking state according to an embodiment of this application.
Figure 7B:
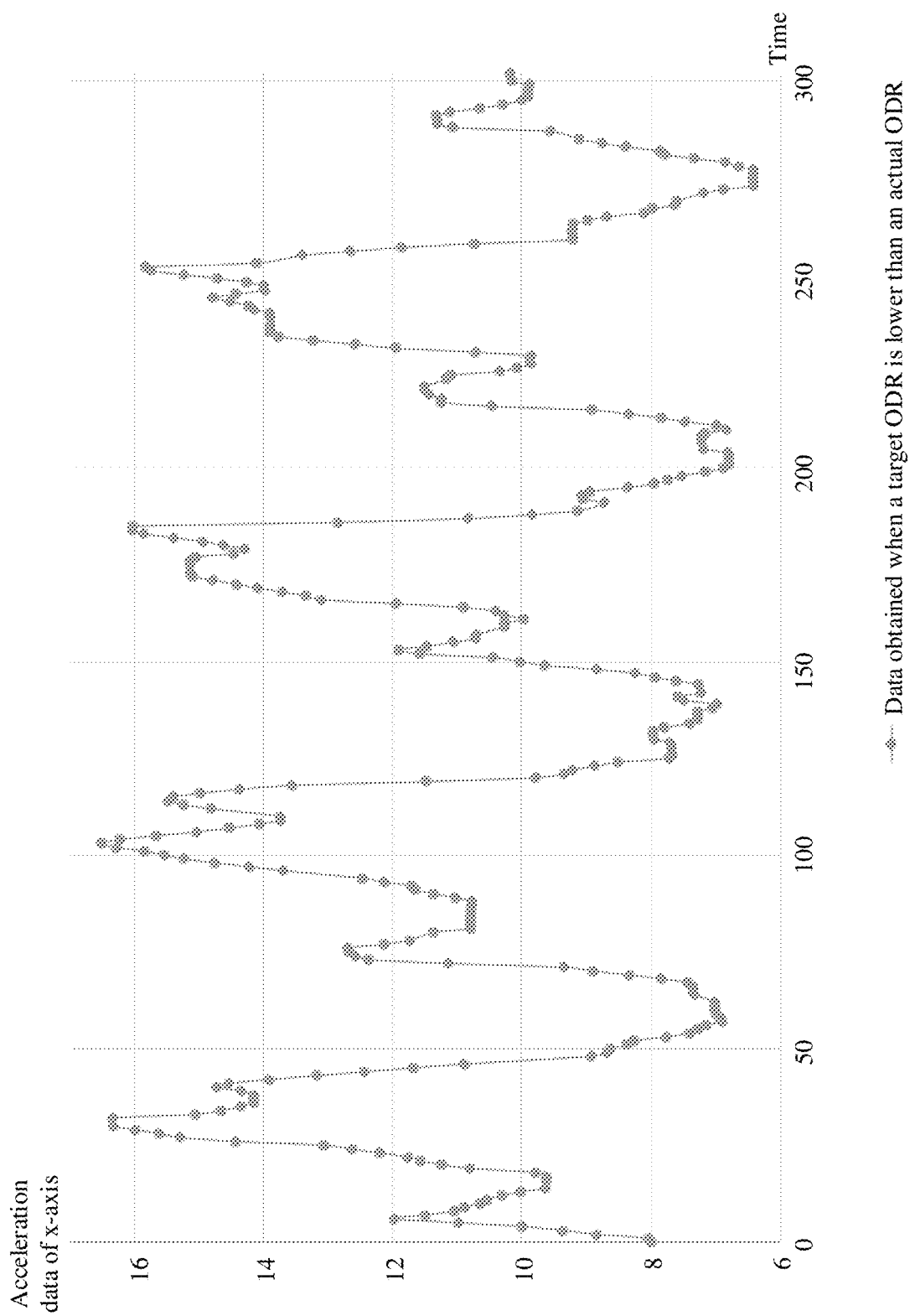
FIG. 7B is a diagram showing a change curve of target acceleration data of an x-axis of an acceleration sensor in a scenario in which a target ODR is lower than an actual ODR in FIG. 7A according to an embodiment of this application.
Figure 7C:
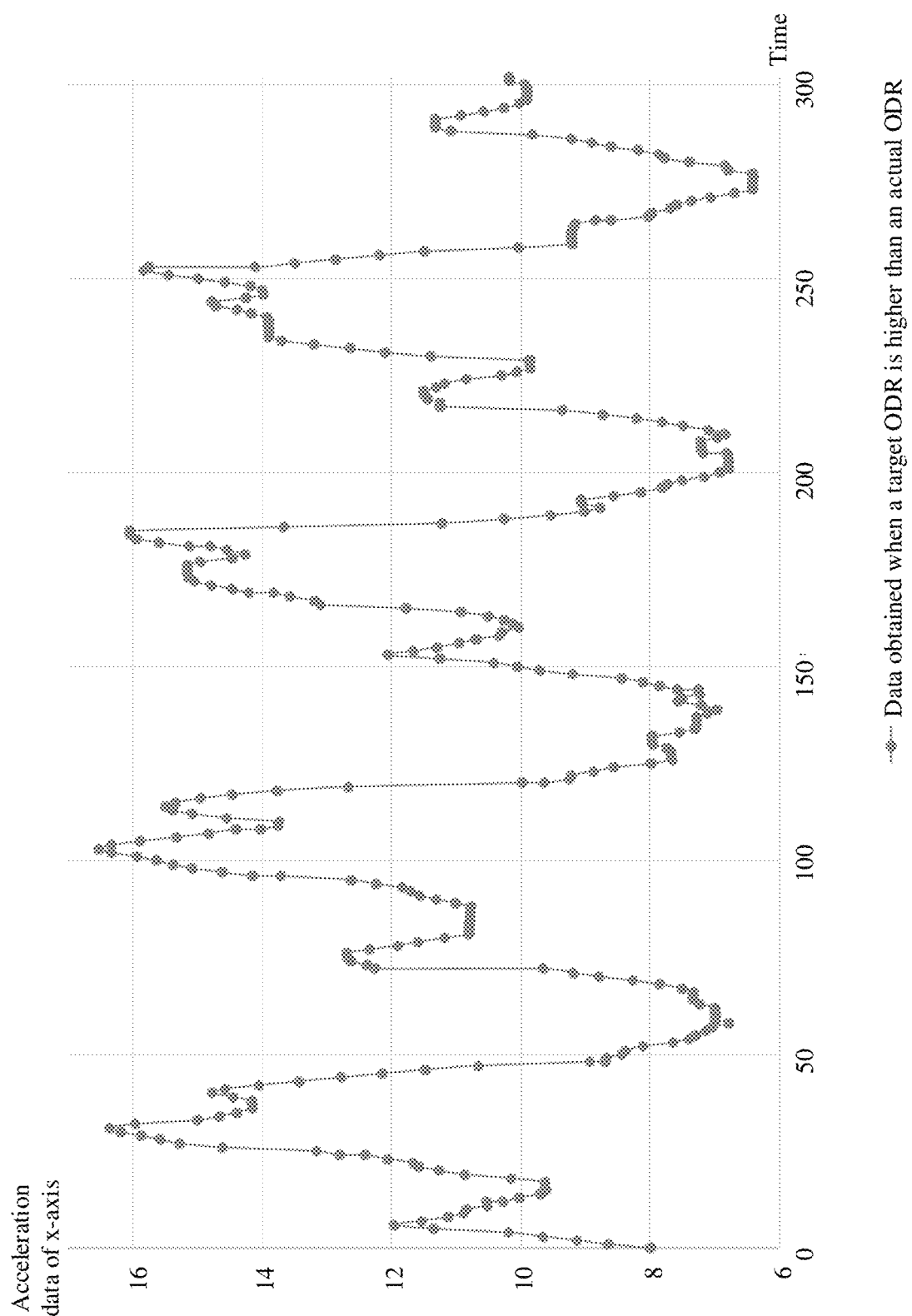
FIG. 7C is a diagram showing a change curve of target acceleration data of an x-axis of an acceleration sensor in a scenario in which a target ODR is higher than an actual ODR in FIG. 7A according to an embodiment of this application.

As shown in FIG. 7A, FIG. 7B, and FIG. 7C, a point in FIG. 7A indicates raw acceleration data of an x-axis that is output by an acceleration sensor at an actual ODR in a walking state. A point in FIG. 7B indicates target acceleration data of an x-axis that is estimated by using the foregoing interpolation algorithm and output by an acceleration sensor based on the target ODR in a scenario in which the target ODR is lower than an actual ODR. A point in FIG. 7C indicates target acceleration data of an x-axis that is estimated by using the foregoing interpolation algorithm and output by an acceleration sensor based on the target ODR in a scenario in which the target ODR is higher than an actual ODR. Curves fitted in FIG. 7A, FIG. 7B, and FIG. 7C are basically the same.

Therefore, it can be learned from tests in FIG. 7A, FIG. 7B, and FIG. 7C that, when the interpolation algorithm provided in this embodiment of this application is used to estimate target sensor data in a group of target ODR, regardless of whether the target ODR is lower than or higher than the actual ODR, a curve fitted to the group of target sensor data estimated is the same as a curve fitted to the raw sensor data, and true changes of the raw sensor data sampled by the sensor can be restored.

It should be further noted that, in this embodiment of this application, an array B[n] may be determined from a graph image fitted to the A[m] by using another algorithm, for example, directly using an image algorithm. In this embodiment of this application, a specific algorithm used in step S403 is not limited.

In this embodiment of this application, a group of target sensor data is obtained through calculation based on a current group of raw sensor data, a total quantity of the data entries in the current group of raw sensor data, a target ODR, and an actual ODR is equivalent to a group of data that is output, based on the target ODR, by the sensor, and corrects the error of the raw sensor data due to the error of the actual ODR.

S404: Provide the group of target sensor data to an application.

The ODR applicable to an algorithm model of the application is a target ODR. Because the target sensor data obtained in step S403 is corresponding sensor data estimated when output, based on the target ODR, by the sensor, the ODR of the target sensor data meets an application requirement; and after receiving the target sensor data, the application may use the target sensor data to implement a specific function.

Figure 8:
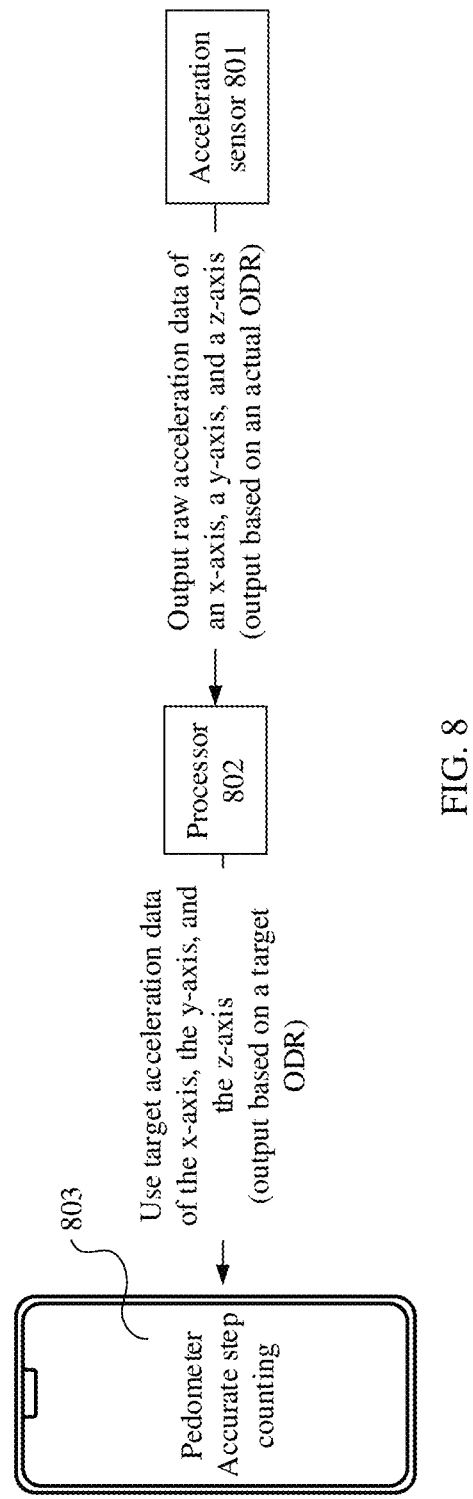
FIG. 8 is a diagram showing a scenario in which a pedometer application in a mobile phone implements a step counting function according to an embodiment of this application.

For example, as shown in FIG. 8, an acceleration sensor in a mobile phone outputs three groups of raw sensor data. The three groups of raw sensor data are output by the sensor based on an actual ODR, and are a group of raw acceleration data of an x-axis, a group of raw acceleration data of a y-axis, and raw acceleration data of a z-axis. Then, after a processor 802 in the mobile phone is calculated in the foregoing manner of step S403, a group of target acceleration data of the x-axis, a group of target acceleration data of the y-axis, and target acceleration data of the z-axis are separately obtained. After a pedometer application in the processor uses the target acceleration data, the pedometer displayed on the display 803 of the mobile phone counts steps accurately.

In some embodiments, the method shown in FIG. 4 may be performed by using a processor of an electronic device. For example, the method shown in FIG. 4 may be performed by an ODR correction module in a system library of the processor. For a related technical description of the processor, refer to the processor 210 in FIG. 2. For description about the ODR correction module, refer to the ODR correction module shown in FIG. 3. Details are not described herein again.

In some embodiments, before step S404 is performed, a processing operation such as filtering may be further performed on the target sensor data, and then a group of processed target sensor data is provided to an application, so that the application uses the group of processed target sensor data to implement a specific function.

In this embodiment of this application, a group of target sensor data is obtained through calculation based on a current group of raw sensor data, a target ODR, and an actual ODR, where the target sensor data is corresponding sensor data estimated when output, based on the target ODR, by the sensor, and can be used to meet an ODR requirement of the application. When the application uses the group of target sensor data to implement the specific function, no function fails or no functional fault occurs.

An embodiment further provides a computer-readable storage medium, where the computer-readable storage medium includes an instruction, and when the instruction is run on an electronic device, the electronic device is enabled to perform related method steps in FIG. 4, to perform the methods in the foregoing embodiments.

An embodiment further provides a readable storage medium, where a computer program is stored on the readable storage medium, and the computer program is executed by a processor to perform any one of the foregoing sensor data processing methods.

This embodiment further provides a computer program product including an instruction, when the computer program product runs on an electronic device, the electronic device is enabled to perform related method steps in FIG. 4, to perform the methods in the foregoing embodiments.

This embodiment further provides a control device, where the control device includes a processor and a memory, the memory is configured to store computer program code, the computer program code includes a computer instruction, and when the processor executes the computer instruction, and the control device performs related method steps in FIG. 4 to perform the methods in the foregoing embodiments. The control device may be an integrated circuit IC, or may be a system on chip SOC. The integrated circuit may be a universal integrated circuit, may be a field programmable gate array FPGA, or may be an application specific integrated circuit ASIC.

According to the foregoing description of the implementations, a person skilled in the art may clearly understand that, for convenience and brevity of the description, division of the foregoing function modules is only used as an example for illustration. In actual application, the foregoing functions can be allocated to different function modules and implemented according to needs, that is, an inner structure of an apparatus is divided into different function modules to implement all or some of the foregoing functions described above. For a specific working process of the system, apparatus and unit described above, reference may be made to a corresponding process in the foregoing method embodiment, and details are not described herein again.

In the several embodiments provided in this embodiment, it should be understood that the disclosed system, apparatus, and method may be implemented in another manner. For example, the described apparatus embodiment is merely an example. For example, the module or unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and components displayed as units may or may not be physical units, that is, may be located in one place, or may be distributed on a plurality of network units. Some or all of the units may be selected based on an actual requirement, to achieve the objectives of the solutions in embodiments.

In addition, function units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions in embodiments essentially, or the part contributing to the conventional technology, or all or some of the technical solutions may be embodied in a form of a software product. The computer software product is stored in a storage medium and includes several instructions for instructing a computer device (which may be a personal computer, a server, a network device, or the like) or a processor to perform all or some of the steps of the methods described in all embodiments. The foregoing storage medium includes any medium that can store program code, for example, a flash memory, a removable hard disk, a read-only memory, a random access memory, a magnetic disk, or an optical disk.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A sensor data processing method, applied to an electronic device, wherein the sensor data processing method comprises:
    obtaining a group of raw sensor data, wherein raw sensor data in the group of raw sensor data is sensor data that is output, based on an actual output data rate (ODR), by a sensor; and
    obtaining a group of target sensor data through calculation based on the group of raw sensor data, a target ODR, and the actual ODR, wherein target sensor data of the group of target sensor data is estimated sensor data that is output, based on the target ODR, by the sensor, and the target sensor data is used to implement a function of an application, and wherein obtaining the group of target sensor data through calculation based on the group of raw sensor data, the target ODR, and the actual ODR comprises:
        obtaining the group of target sensor data using an interpolation algorithm based on the group of raw sensor data, the target ODR, and the actual ODR, and wherein obtaining the group of target sensor data by using the interpolation algorithm based on the group of raw sensor data, the target ODR, and the actual ODR comprises:
            obtaining a total quantity of data entries in the group of target sensor data through calculation based on a time length of the group of raw sensor data and the target ODR, wherein the time length of the group of raw sensor data is a ratio of a total quantity of data entries in the group of raw sensor data to the actual ODR; and
            obtaining the group of target sensor data through calculation, after the actual ODR, the target ODR, the time length of the group of raw sensor data, the total quantity of the data entries in the group of raw sensor data, the total quantity of the data entries in the group of target sensor data, and the group of raw sensor data are substituted into the interpolation algorithm.

2. The sensor data processing method according to claim 1, wherein before obtaining the group of target sensor data through calculation based on the group of raw sensor data, the target ODR, and the actual ODR, the method further comprises:
    determining the actual ODR of the sensor.

3. The sensor data processing method according to claim 2, wherein determining the actual ODR of the sensor comprises:
    obtaining the actual ODR of the sensor through calculation based on the time length of the group of raw sensor data and the total quantity of the data entries in the group of raw sensor data.

4. The sensor data processing method according to claim 1, wherein after obtaining the group of target sensor data through calculation based on the group of raw sensor data, the target ODR, and the actual ODR, the method further comprises:
    sending the group of target sensor data to the application, so that the application uses the group of target sensor data to implement the function.

5. The sensor data processing method according to claim 4, wherein before sending the group of target sensor data to the application, the method further comprises:
    obtaining a group of processed target sensor data by performing filtering processing on the group of target sensor data; and
    wherein sending the group of target sensor data to the application comprises sending the group of processed target sensor data to the application, so that the application uses the group of processed target sensor data to implement the function.

6. The sensor data processing method according to claim 1, wherein the actual ODR is different than a calibrated ODR of the sensor.

7. The sensor data processing method according to claim 6, wherein a difference between the actual ODR and the calibrated ODR of the sensor depends on a clock system error of the sensor.

8. An electronic device, comprising:
one or more sensors, configured to output raw sensor data to one or more processors;
the one or more processors; and
a memory, wherein a program is stored on the memory, and
wherein when the program is executed by the one or more processors, the electronic device is enabled to:
    obtain a group of raw sensor data, wherein raw sensor data of the group of raw sensor data is sensor data that is output, based on an actual output data rate (ODR), by a sensor; and
    obtain a group of target sensor data through calculation based on the group of raw sensor data, a target ODR, and the actual ODR, wherein target sensor data of the group of target sensor data is estimated sensor data that is output, based on the target ODR, by the sensor, and the target sensor data is used to implement a function of an application, and wherein obtaining the group of target sensor data through calculation based on the group of raw sensor data, the target ODR, and the actual ODR comprises:
        obtaining the group of target sensor data using an interpolation algorithm based on the group of raw sensor data, the target ODR, and the actual ODR, and wherein obtaining the group of target sensor data by using the interpolation algorithm based on the group of raw sensor data, the target ODR, and the actual ODR comprises:
            obtaining a total quantity of data entries in the group of target sensor data through calculation based on a time length of the group of raw sensor data and the target ODR, wherein the time length of the group of raw sensor data is a ratio of a total quantity of data entries in the group of raw sensor data to the actual ODR; and
            obtaining the group of target sensor data through calculation, after the actual ODR, the target ODR, the time length of the group of raw sensor data, the total quantity of the data entries in the group of raw sensor data, the total quantity of the data entries in the group of target sensor data, and the group of raw sensor data are substituted into the interpolation algorithm.

9. The device according to claim 8, wherein the electronic device is further enabled to:
before obtaining the group of target sensor data through calculation based on the group of raw sensor data, the target ODR, and the actual ODR, determine an actual ODR of the one or more sensors.

10. The device according to claim 9, wherein determining the actual ODR of the one or more sensors comprises:
obtaining the actual ODR of the one or more sensors through calculation based on the time length of the group of raw sensor data and the total quantity of the data entries in the group of raw sensor data.

11. The device according to claim 8, wherein the electronic device is further enabled to:
after the obtaining the group of target sensor data through calculation based on the group of raw sensor data, the target ODR, and the actual ODR, sending the group of target sensor data to the application, so that the application uses the group of target sensor data to implement the function.

12. The device according to claim 11, wherein the electronic device is further enabled to:
before the sending the group of target sensor data to the application, obtaining a group of processed target sensor data by performing filtering processing on the group of target sensor data; and
wherein sending the group of target sensor data to the application comprises sending the group of processed target sensor data to the application, so that the application uses the group of processed target sensor data to implement a specific function.

13. The device according to claim 8, wherein the actual ODR is different than a calibrated ODR of the one or more sensors.

14. The device according to claim 13, wherein a difference between the actual ODR and the calibrated ODR of the sensor depends on a clock system error of the sensor.

15. A non-transitory computer readable storage medium, wherein a computer program is stored on the non-transitory computer readable storage medium, and the computer program is executed by a processor to:
    obtain a group of raw sensor data, wherein raw sensor data of the group of raw sensor data is sensor data that is output, based on an actual output data rate (ODR), by a sensor; and
    obtain a group of target sensor data through calculation based on the group of raw sensor data, a target ODR, and the actual ODR, wherein target sensor data of the group of target sensor data is estimated sensor data that is output, based on the target ODR, by the sensor, and the target sensor data is used to implement a function of an application, and wherein obtaining the group of target sensor data through calculation based on the group of raw sensor data, the target ODR, and the actual ODR comprises:
        obtaining the group of target sensor data using an interpolation algorithm based on the group of raw sensor data, the target ODR, and the actual ODR, and wherein obtaining the group of target sensor data by using the interpolation algorithm based on the group of raw sensor data, the target ODR, and the actual ODR comprises:
            obtaining a total quantity of data entries in the group of target sensor data through calculation based on a time length of the group of raw sensor data and the target ODR, wherein the time length of the group of raw sensor data is a ratio of a total quantity of data entries in the group of raw sensor data to the actual ODR; and
            obtaining the group of target sensor data through calculation, after the actual ODR, the target ODR, the time length of the group of raw sensor data, the total quantity of the data entries in the group of raw sensor data, the total quantity of the data entries in the group of target sensor data, and the group of raw sensor data are substituted into the interpolation algorithm.

16. The non-transitory computer readable storage medium according to claim 15, wherein the computer program is executed by the processor further to:
before obtaining the group of target sensor data through calculation based on the group of raw sensor data, the target ODR, and the actual ODR, determine the actual ODR of the sensor.

17. The non-transitory computer readable storage medium according to claim 16, wherein determining the actual ODR of the sensor comprises:

obtaining the actual ODR of the sensor through calculation based on the time length of the group of raw sensor data and the total quantity of the data entries in the group of raw sensor data.

18. The non-transitory computer readable storage medium according to claim 15, wherein the computer program is executed by the processor further to:

after obtaining the group of target sensor data through calculation based on the group of raw sensor data, the target ODR, and the actual ODR, send the group of target sensor data to the application, so that the application uses the group of target sensor data to implement the function.

19. The non-transitory computer readable storage medium according to claim 18, wherein the computer program is executed by the processor further to:

before sending the group of target sensor data to the application, obtaining a group of processed target sensor data by performing filtering processing on the group of target sensor data; and wherein sending the group of target sensor data to the application comprises sending the group of processed target sensor data to the application, so that the application uses the group of processed target sensor data to implement the function.

20. The non-transitory computer readable storage medium according to claim 15, wherein the actual ODR is different than a calibrated ODR of the sensor.

* * * * *